July 8, 1941.  H. C. SNOW  2,248,133
TRANSMISSION
Filed July 28, 1938   6 Sheets-Sheet 1
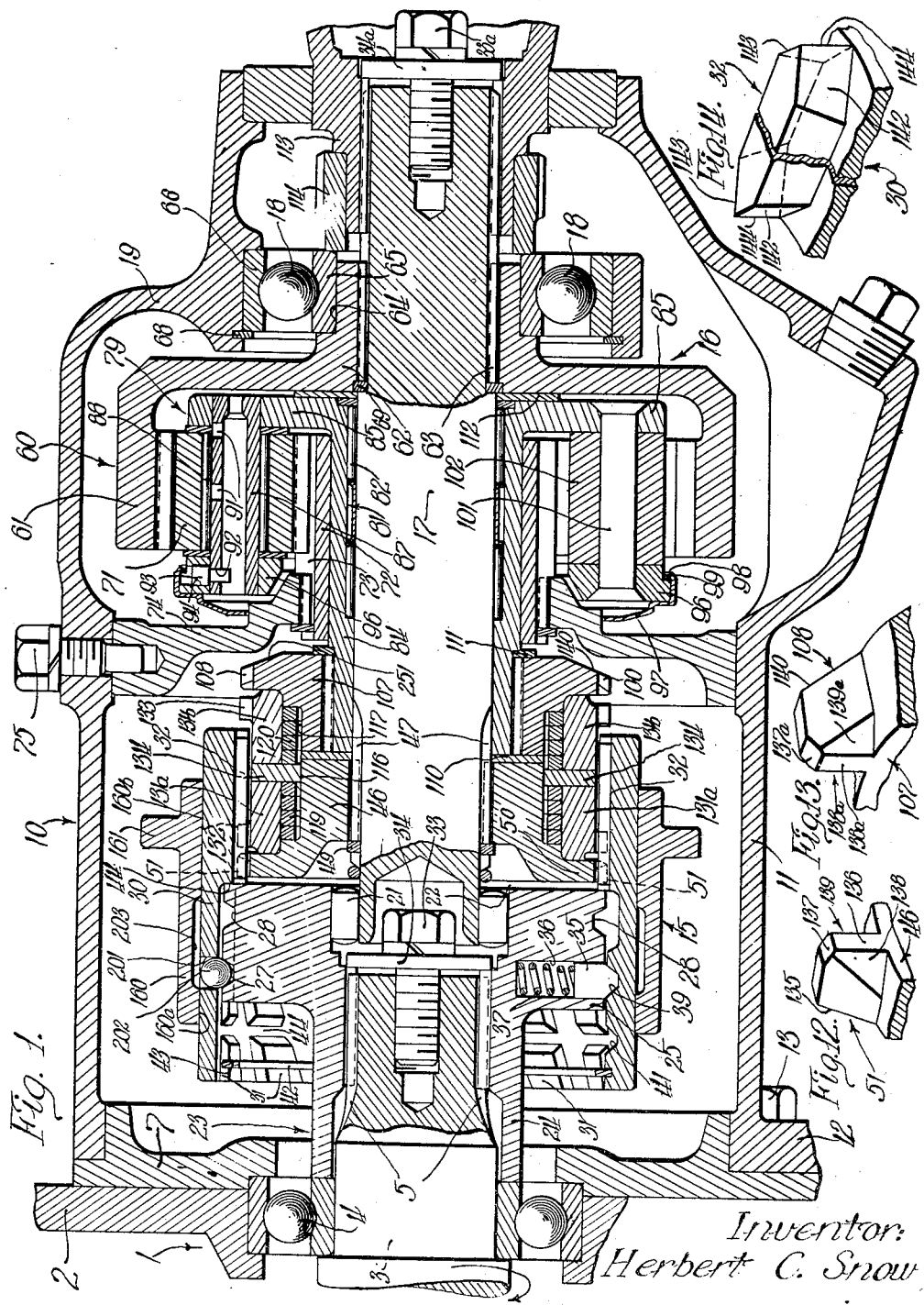
Inventor:
Herbert C. Snow
By [signature]
Attys.

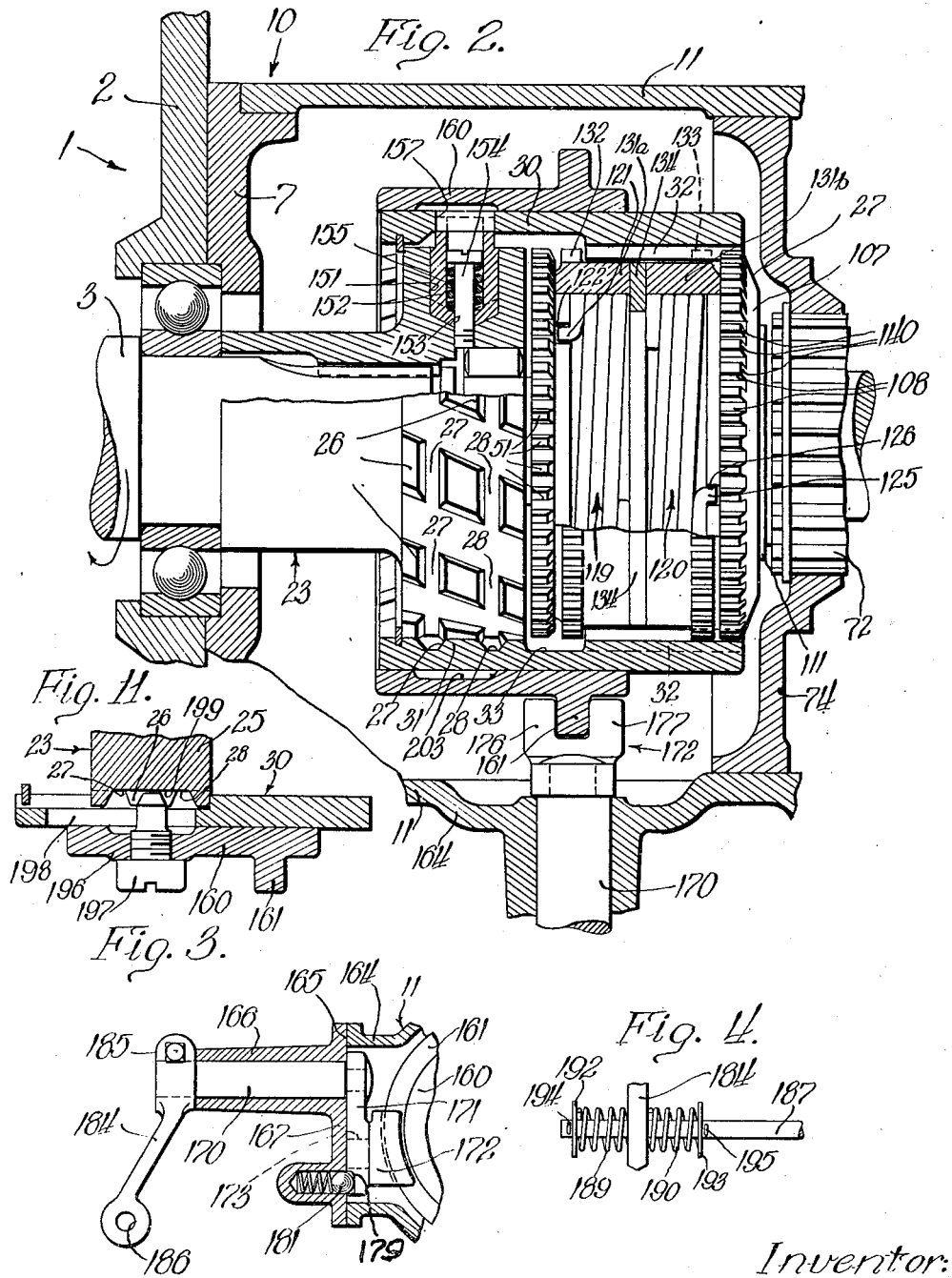

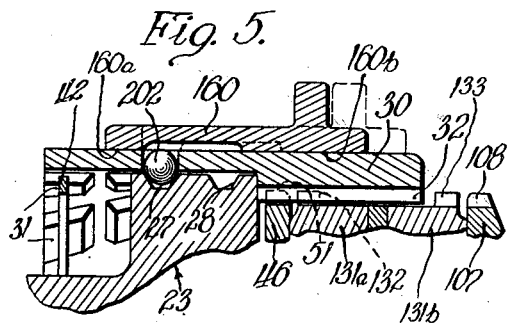
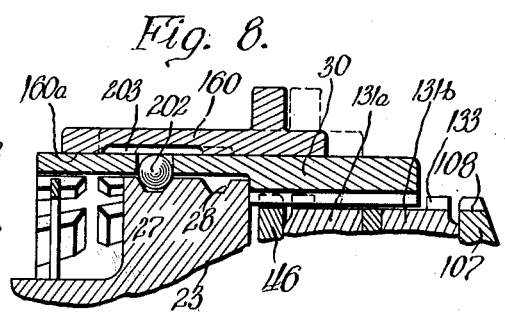
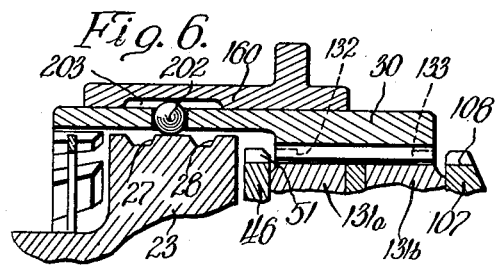
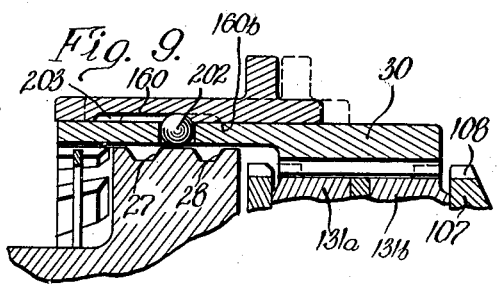
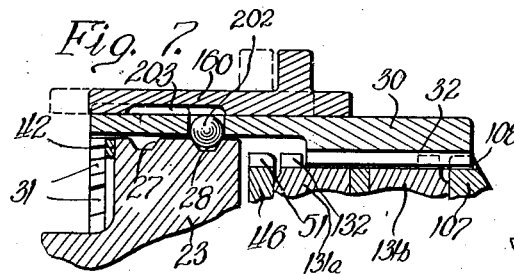
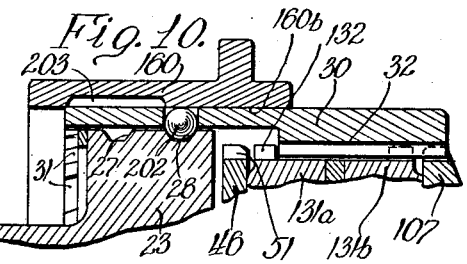
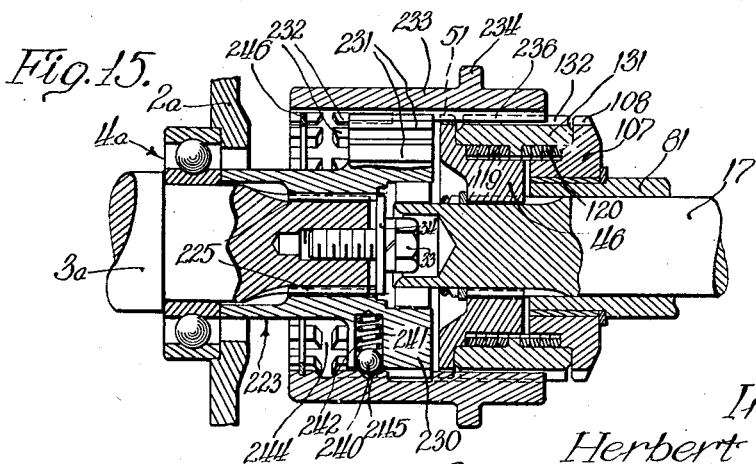

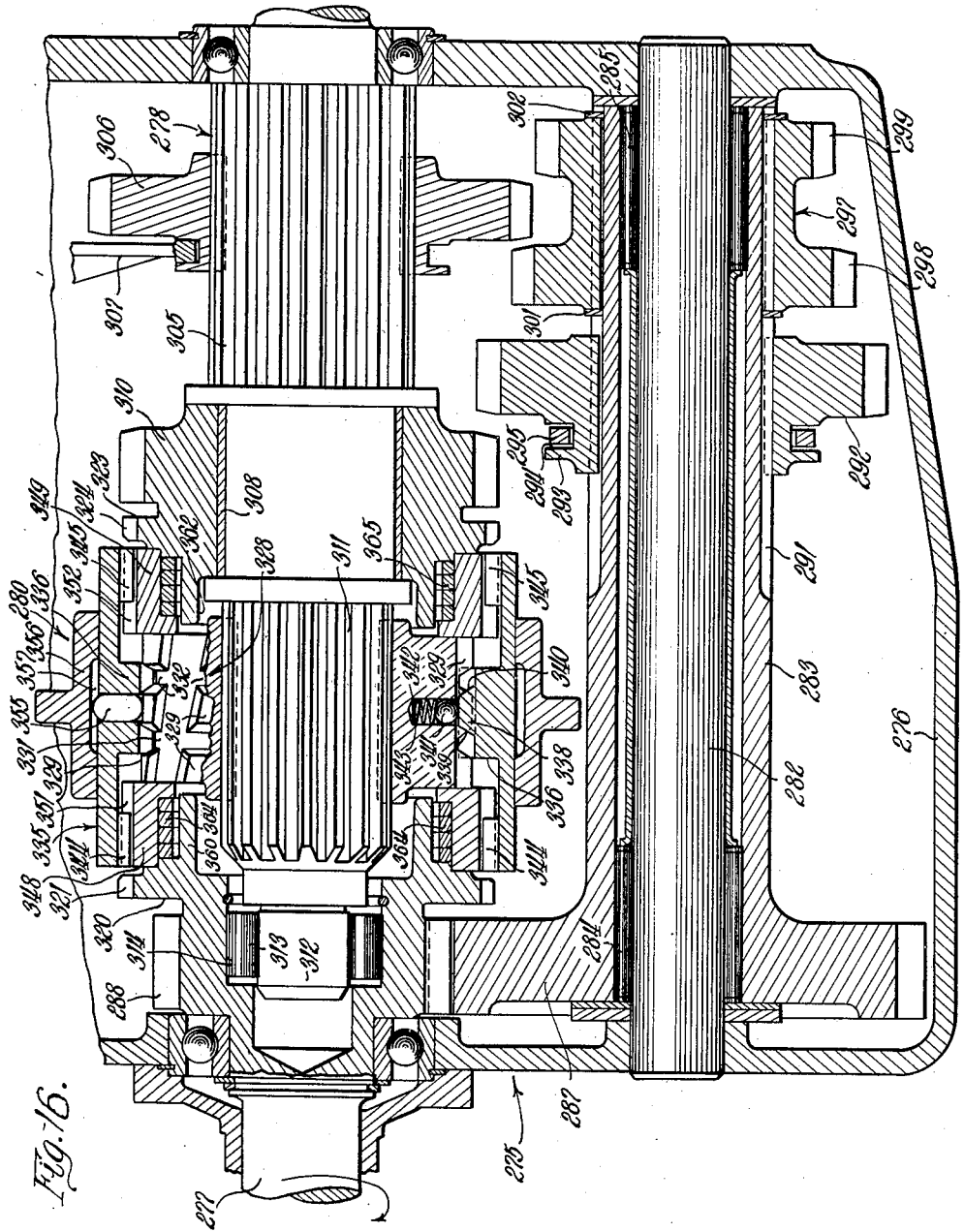

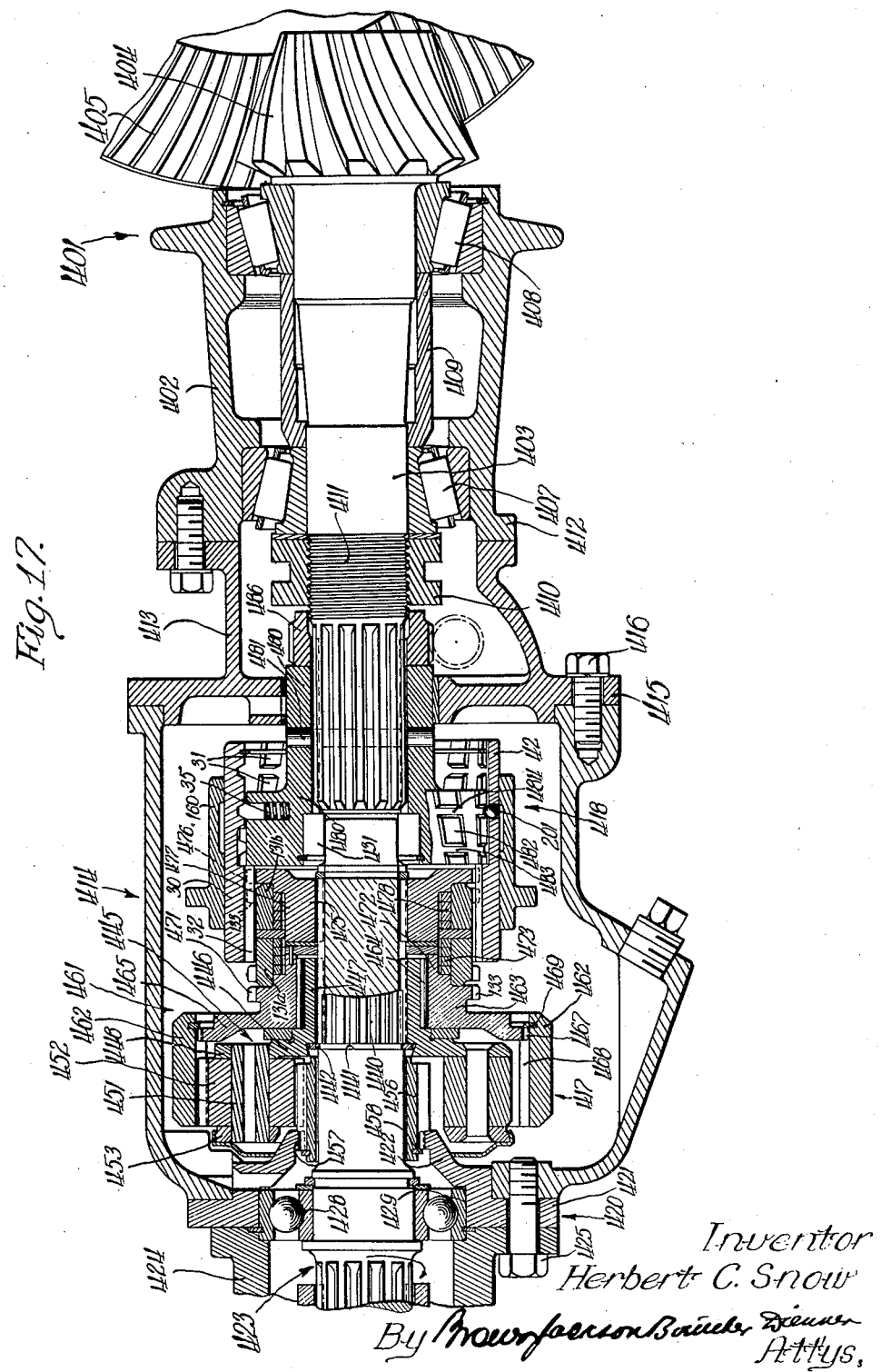

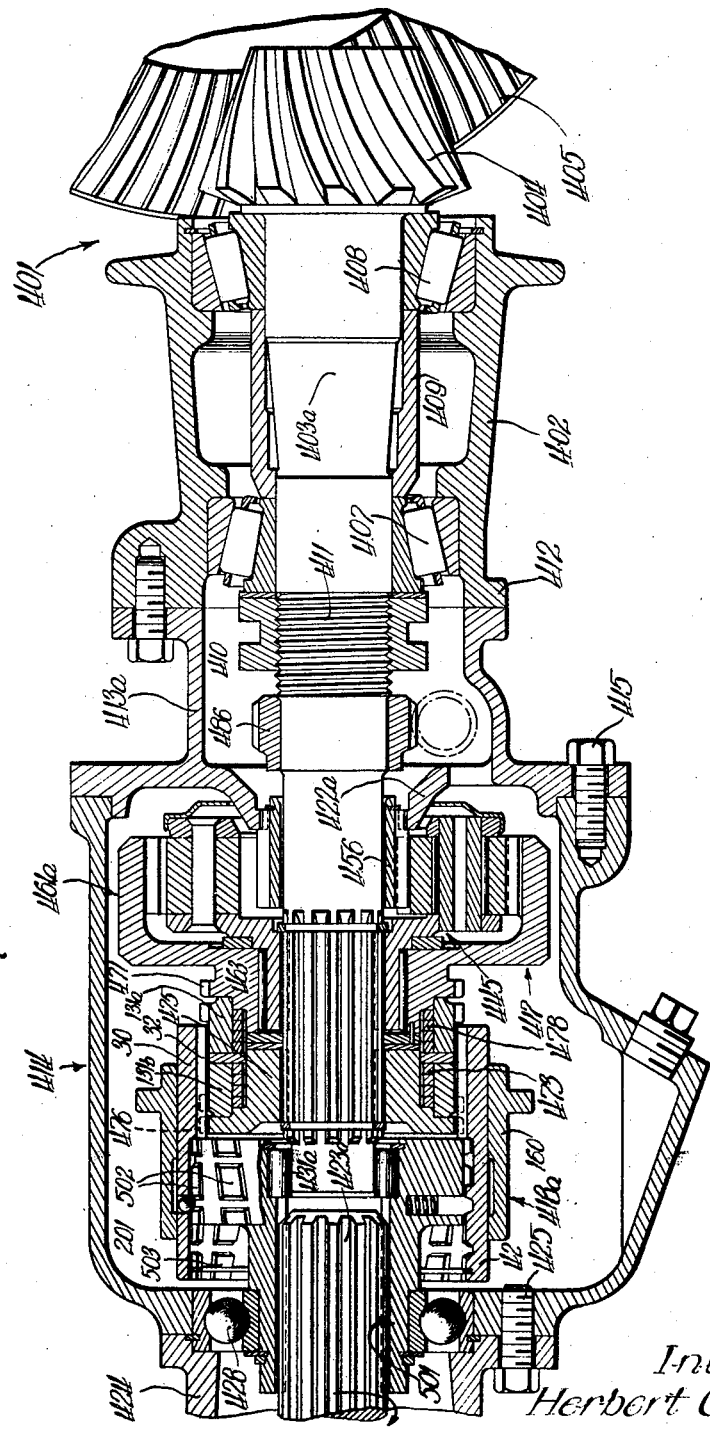

Patented July 8, 1941

2,248,133

UNITED STATES PATENT OFFICE 2,248,133

TRANSMISSION

Herbert C. Snow, Auburn, Ind., assignor of one-fourth to Clarence H. Dooley, Rock Island, Ill., one-fourth to H. Keith Dooley, Los Angeles, Calif., and one-fourth to Delmar D. Dooley, Rock Island, Ill.

Application July 28, 1938, Serial No. 221,724

29 Claims. (Cl. 74—259)

This invention relates to transmissions, especially to those adapted for automotive use, and is concerned more particularly with transmissions of the type having mechanism for automatically changing the driving ratio.

The object and general nature of this invention is to provide a transmission unit having a torque controlled mechanism for changing the ratio automatically in response to torque conditions but which is, nevertheless, subject to a manual control by the operator, making it possible to lock the unit in the desired ratio or to manually pre-select a ratio in which the parts will be locked when that ratio is selected by the operation of the automatic mechanism.

A further feature of this invention is the provision of a unit affording two different ratios, preferably controlled by the transmitted torque, in which when the driving connection in one ratio is interrupted, preparatory to shifting into the other ratio, a connection is maintained which while insufficient to drive the vehicle is sufficient to insure a positive and complete shift unto the other ratio. This is an important feature of the invention, especially when incorporated in a torque responsive device, in that it insures a positive and complete shift from one ratio to another without any danger of the mechanism remaining temporarily isolated in an intermediate position resulting in hunting or in ratcheting or chattering of the gears, and in which no torque would be transmitted.

Another feature of this invention is the provision of a torque responsive transmission in which two different ratios are automatically controlled, respectively, by the torque in opposite directions. Another feature in this connection is the provision of biased means acting normally to hold the mechanism in either ratio until overcome by the torque transmitted in the direction to which the torque controlled mechanism is responsive.

Another important feature of the present invention is the provision of an overdrive or an underdrive unit for transmissions and the like in which the ratios available are automatically controlled according to the torque transmitted, and a further feature of this invention is the provision of an automatic transmission in which one or more torque responsive units may be incorporated, each affording an automatic control of two different ratios.

These and other objects and advantages of my invention will be apparent to those skilled in the art after a consideration of the following detailed description, taken in conjunction with the accompanying drawings.

In the drawings:

Figure 1 is a longitudinal vertical section taken through a transmission overdrive unit in which the principles of the present invention have been embodied;

Figure 2 is a fragmentary view showing certain of the parts of the torque responsive mechanism in elevation;

Figure 3 is a fragmentary section at a reduced scale, taken transversely of the transmission and illustrating one form of the manual control for the pre-selecting locking arrangement;

Figure 4 is a view illustrating the yielding connection between the manually controlled part and the locking sleeve;

Figures 5 to 7 illustrate the movement of the torque-responsive sleeve in shifting from its direct drive position to its over-drive position, with the manual control unlocked;

Figures 8 to 10 illustrate the same movement of the torque-responsive sleeve, from direct drive to overdrive, but with the manual lock in a position pre-selecting the retention or locking of the sleeve in its overdrive position;

Figure 11 shows in section the means for retaining the torque-responsive sleeve against rotation on the driving member but accommodating its generally axial movement;

Figures 12 to 14 are fragmentary perspective views, showing the form of clutch teeth employed on the shiftable torque-responsive sleeve and the associated clutch members to prevent jamming;

Figure 15 is a reduced section taken through a modified form of the present invention in which the feature of torque responsive control is replaced by a manual control;

Figure 16 is a longitudinal vertical section of automatic transmission embodying the features of the present invention;

Figure 17 is a sectional view showing an overdrive unit adapted for installation at the rear axle, with the torque-responsive unit arranged rearwardly of the planetary unit; and Figure 18 is a view similar to Figure 17 but with the parts reversed in order to provide a reduction unit instead of an overdrive unit.

Referring now more particularly to Figures 1 and 2, in which the principles of the present invention have been embodied in an overdrive unit which is adapted to be secured at the rear end of a conventional transmission and driven from the driven shaft of the latter, the reference numeral 1 indicates a conventional transmission including a rear wall 2 and a main driven shaft 3. Suitable bearings 4 are carried by the rear wall 2 to support the shaft 3. The latter is splined at 5 to receive, normally, the universal joint of the propeller shaft, but in the present instance it receives the driving part of the overdrive unit in which the present invention has been incorporated.

The overdrive unit is indicated in its entirety by the reference numeral 10 and includes a housing or casing 11 having a flange 12 by which it may be secured, either directly to the transmission casing wall 2 in a suitable manner, or to an adapter plate 7, as by cap screws 13. The mechanism enclosed within the overdrive casing 11 includes, generally, a torque responsive device 15 and an epicyclic gear change unit 16. A driven shaft 17 is supported by suitable bearings 18 in the rear wall 19 of the casing 11 and at its forward end the shaft 17 is piloted, as at 21, in a recess 22 formed in the rear portion of a driving member indicated in its entirety by the reference numeral 23. The member 23 includes a hub 24 that is splined to receive the end 5 of the transmission shaft 3, which constitutes a driving shaft for the overdrive mechanism, and the rear portion of the member 23 extends radially outwardly in the form of a drum or flange 25, the peripheral surface of which is provided with helical splines 26 (Figure 2) which are interrupted by a pair of peripherally extending axially spaced grooves 27 and 28 disposed about the driving member 23. Engaging the helical splines 26 of the latter is an axially shiftable torque-responsive sleeve 30 which is provided on its interior surface with two sets of splines, as at 31 and 32, separated by an interrupted portion. The splines 31 are disposed at the forward end of the sleeve 30 and are also helical so as to mesh with the splines 26 on the driving member 23. The rear set of splines 32 are axially straight and are not helical or spiral. A cap screw 33 bears against a washer 34 which engages the splines on the driving member 23 for the purpose of holding the latter fixed to the rear end of the shaft 3. The forward end of the member 23 holds the inner race of the bearing means 4 up against a shoulder on the shaft 3.

The sleeve 30 is shiftable generally axially relative to the driving member 23 and is yieldingly held in either position by a plunger 35 which is disposed in a recess 36 formed in the driving member 23. The plunger 35 is biased for outward movement by a spring 37. While only one plunger 35 is shown, it will be understood that as many plungers may be employed as desired. The outer end of each plunger is beveled to seat into either one of two peripheral grooves 39 and 41 which are formed in the splines 31, as best shown in Figure 1. Axial shifting movement of the sleeve 30 is limited in one direction by a spring ring 42 which seats in a groove 43 formed in the spline teeth 31, and movement of the sleeve 30 in the other direction is limited by the engagement of a shoulder 44 with the rear face of the member 23, as shown in Figure 1.

When the sleeve 30 is shifted from one position to another it is necessary at first to exert appreciable force in order to depress the plunger 35 against the action of the spring 37, but once the bias of the plungers 35 has been overcome no further exertion of force is necessary, other than enough to overcome the slight frictional resistance, in order to complete the shifting movement of the sleeve 30 and position it so that the plungers 35 enter the other groove 41. The same action is present when the sleeve 30 is to be shifted back from the position shown in Figure 2. It will be understood that if only one or a limited number of plungers 35 are employed, the grooves 39 and 41 may, if desired, take the form of a notch or notches in certain of the splines 31, since it is not absolutely necessary that all of the splines 31 have the grooves 39 and 41 formed therein. However, for convenience of manufacture and assembly I prefer to cut the grooves 39, 41 as continuous through all of the splines 31.

The rear internal splines 32 on the shiftable sleeve 30 are, as described above, in the form of axially directed straight teeth. Adjacent its forward end the driven shaft 17 carries a collar 46 which is mounted on the splined portion 47 in fixed nonrotatable relation. The collar 46 has interior splines interengaging with the splines 47, and at the forward end of the shaft 17 a spring ring 49 seats in a groove formed in the shaft and serves to hold the collar 46 in position on the shaft 17. The peripherally outer portion of the collar 46 is flanged, as at 50, and is provided with a plurality of clutch teeth 51, the form of which is best shown in Figure 12 and will be referred to later.

Surrounding the rear portion of the driven shaft 17 is an epicyclic gear unit indicated in its entirety by the reference numeral 60. The epicyclic gear unit is preferably of the overdrive type and includes a ring gear 61 having a hub 62 which is fastened in nonrotatable relation to the rear end of the shaft 17, preferably by being splined and mounted on splines 63 at the rear end of the shaft 17. The hub 62 of the ring gear 61 is also formed, as at 64, to receive the inner race 65 in which the bearings 18 are carried, the outer race 66 being fixed to the housing wall 19 of the overdrive casing 11 in any suitable manner, as by a spring ring 68. The ring gear member 60 is held against forward movement on the shaft 17 by a ring or collar 69 disposed against a shoulder on the shaft 17 at the inner ends of the splines 63. A plurality of planet gears 71 mesh with the ring gear 61 and with a sun gear 72 having teeth 73 which are extended into a stationary yoke 74 that is secured in fixed relation to the casing 11 by any suitable means, such as one or more cap screws 75. The planet gears 71 are supported in the proper position by a gear carrier or cage indicated in its entirety by the reference numeral 79. The cage or carrier comprises a member 81 journaled for rotation by suitable bearings 82, preferably of the needle type, on the driven shaft 17. The member 81 includes a forwardly extending hub section 84 and a flanged section 85, the latter being apertured to receive a plurality of tubular pivots 87 upon which the planet gears 71 are mounted for rotation, as by bearings 88. Preferably, the pins 87 are hollow and are provided with one or more oil openings 91 to facilitate lubrication of the bearings 88. Each pivot pin 87 is also provided with an opening 92 to receive a locking pin 93 which is received in an aperture 94 in a ring 96 that forms a part of the planet gear carrier or cage 79. A sheet metal shell 97 is disposed above the ring 96 and has portions 98 clamped about a shoulder 99 formed on the ring 96 for the purpose of holding the pins 93 in position. The flange 85 and the ring 96 are also apertured to receive rivets 101 on which suitable spacing sleeves 102 are mounted. Each rivet and its associated sleeve is disposed between adjacent planet gears.

Since the ring gear 61 is constantly connected to the rear end of the driven shaft 17 and the sun gear is constantly held against rotation, it will be seen that rotation of the gear carrier 79 will act through the planet gears and react against the sun gear to drive the ring gear at a speed greater than the speed of the gear carrier 79.

A collar or clutch member 107 is fixed, as by being splined, keyed, or otherwise, to the forward end of the planet gear carrier member 81. The member 107 is similar to the member 46 in that it is provided with a plurality of teeth 108 (Figure 13), the members 46 and 107 being axially aligned but with their toothed portions 51 and 108 separated by a space. An anti-friction thrust ring 110 is disposed between the members 46 and 107 and serves to hold the collar 107 up against a snap ring 111. A rear thrust ring 112 is placed between the member 81 and the member 62. A cap screw 33a and a washer 34a clamp the universal joint part 113 and speedometer gear 114 against the race 65 on the rear end of the shaft 17, and this holds the ring gear member 60 against the ring 69, thereby preventing any relative axial movement between the parts of the epicyclic gear unit.

The collar members 46 and 107 have recessed sections 116 and 117 to provide space accommodating a pair of overrunning clutch springs 119 and 120, best shown in Figure 2. The clutch spring 119 has an end 121 turned axially and engaged in a notch 122 formed in the member 46 adjacent the base of the flanged section 50. The other end of the spring 119 is free. The other spring 120 is formed with a similarly bent end 125 which is received in a notch 126 formed in the other collar member 107, and similarly the other end of the spring 120 is free. A pair of sleeves 131a and 131b surround the clutch springs 119 and 120, the internal diameter of the sleeves 131a and 131b and the external diameters of the clutch springs 119 and 120 being such that the parts are in close fitting relationship. The sleeves 131a and 131b carry, respectively, sets of straight splines or teeth 132 and 133 (Figures 1 and 2) one or the other set of which are in constant mesh with the internal splines or teeth 32 on the shiftable sleeve 30, but never both except during an intermediate position during a shift, as will be explained below. The sleeve sections are spaced apart by an anti-friction ring 134. The clutch teeth 51 and 108 are of the same pitch as the teeth 132 and 133, whereby in one position the shiftable sleeve 30, which it will be remembered is at all times in driving connection with the drive member 23 and the shaft 3, connects one of the sleeves 131a or 131b with one of the clutch collars, and in the other position the sleeve 30 connects the other of the sleeve members 131a or 131b with the other clutch collar. The clutch spring 119 is so arranged that the clutch collar 46, which is fixed directly to the driven shaft 17, may overrun the sleeve member 131a, assuming that the direction of rotation of the parts is as indicated by the arrow in Figures 1 and 2, but the member 131a cannot overrun the clutch collar 46. The other spring 120 is so arranged that the member 131b may overrun the clutch collar 107, but the latter cannot overrun the member 131b.

The clutch teeth 51 and 108 on the clutch members 46 and 107 are specially formed, also the teeth 32 on the shiftable sleeve 30, as best shown in Figures 12, 13 and 14, so as to facilitate the ready and positive engagement of the shiftable sleeve with the associated clutch collars when the sleeve is shifted, either automatically or manually. Figure 12 is a perspective view of one of the clutch teeth 51 on the clutch collar 46. As indicated, the ends 135 and 136 of each tooth are in radial planes, but the end 136 of each tooth is chamfered, preferably at 45°, as indicated at 137. This end of each tooth is also cut away to form tapered edges 138 and 139 which lie in planes that extend generally radially but which are disposed substantially at right angles to each other. The end 136 of each tooth is therefore particularly formed to enter into mesh with a companion toothed part. The clutch teeth 108 are of generally the same configuration as just described and, as best shown in Figure 13, have ends 136a which are narrow and are flanked by tapered edges 138a and 139a, each tooth 108 being beveled, as at 137a. The end of each tooth 108 opposite the end 136a is, unlike the tooth shown in Figure 12, formed with a backward bevel, indicated at 140 in Figures 1, 2, and 13. The width of the end sections 136 and 136a are somewhat exaggerated in Figures 12 and 13 in order to show the form of teeth clearly. The teeth 32 on the torque-responsive shiftable sleeve 30 are formed with edges or ends that come to a point so as to facilitate the movement of the associated shiftable sleeve into engagement with the associated clutch teeth 51 and 108. Referring now to Figure 14, it will be noted that opposite ends of each tooth are formed by surfaces 142 and 143 which lie in generally radial planes, but which extend substantially at right angles to each other, thereby forming at each end of the tooth an entering edge. The outer ends of the teeth 132 and 133 on the sleeves 131a and 131b preferably are formed as just described in connection with Figure 12.

By virtue of this construction, whenever the shiftable sleeve 30 is moved toward engagement with one or the other of the associated clutch members, the sleeve teeth readily enter between the clutch teeth without abutting or becoming jammed. This is an important feature of the present invention, particularly in connection with the automatic torque responsive shift control.

The operation of the mechanism so far described is as follows, referring particularly to Figures 5 to 10, inclusive:

Remembering that the driven shaft 3 of the transmission 1 constitutes the driving shaft of the unit 10 and that the sleeve 30 is drivingly connected at all times, but arranged for axial movement relative to, the driving member 23, when the parts are arranged as indicated in Figure 1, it will be seen that the drive is transmitted from the members 3 and 23 through the shiftable sleeve 30 to the clutch collar 46, since the member 30 is in its forwardmost position. Thus, the shafts 3 and 17 are adapted to rotate together, at a direct or one-to-one ratio. The splines 26 and 31 are so angled with respect to the direction of rotation of the parts that the torque transmitted from one shaft to the other exerts a component of force tending to move the sleeve 30 forwardly until the shoulder 44 engages the rear face of the member 23, which limits the forward movement of the sleeve, thereafter holding the sleeve 30 in this position in which the drive is transmitted directly from the shaft 3 through the members 23 and 30 to the collar 46 which is fixed directly to the shaft 17. In this position of the sleeve 30 the spring biased plunger 35 engages in the groove 39 and serves as means for yieldingly holding the sleeve 30 in that position. Upon the occurrence of a reversal of the torque, that is, when the shaft 17 tends to drive the shaft 3, as would be the case when the driver of an automobile closes the throttle and uses the engine as a brake to decelerate the car, the torque transmitted from the shaft 17 forwardly to the shaft 3 exerts a component of force tending to shift the sleeve 30 rearwardly, due to the aforesaid angular relation of the teeth 26 and 31. This movement of the sleeve 30 is, however, opposed by the resistance offered by spring biased plungers 35, but if the torque transmitted is sufficient, the resistance of the plungers 35 may be overcome, with the result that the springs 37 yield and the plungers 35 move inwardly out of the groove 39, thus permitting the sleeve 30 to shift rearwardly. When the plunger or plungers 35 have been forced entirely out of the groove 39, which occurs before the teeth 32 and 51 become disengaged, there is no further appreciable resistance to the rearward movement of the sleeve 30 so that the latter moves until the teeth 32 are fully disengaged from the teeth 51 on the driven shaft clutch member 46, as shown in Figure 6.

At this stage the shiftable sleeve 30 is in an intermediate position, that is, its teeth 32 are out of engagement with the clutch member 46 but are not in engagement with the teeth 108 on the clutch collar 107, and since the plunger 35 is entirely out of the groove 39 and is riding on the flat interior portion of sleeve 30 between the grooves 39 and 41, the sleeve 30 is quite free to move axially in either direction. This does not mean, however, that the sleeve 30 is entirely disconnected from either of the shafts 3 or 17. Under the condition of operation assumed, where the driven shaft 17 is driving the shaft 3 and associated parts in the direction of the arrow in Figure 1, and remembering that the member 107 is being driven at a reduced rate through the epicyclic gear unit 60 from the shaft 17, as soon as the teeth 32 are out of engagement with the clutch member 46, the shaft 3 and sleeve 30 continue to decelerate until their speed is equal to the speed at which the clutch member 107 and gear carrier or cage 79 are driven by the shaft 17 through the epicyclic gear unit. As soon as the speed of the shaft 3, sleeve 30, and members 131a and 131b has dropped down to the speed of the clutch member 107, the overrunning clutch spring 120 takes hold of the sleeve section 131b and then the reversed torque begins to be transmitted from the engine back to the shaft 17 through the epicyclic gear unit, the clutch member 107, the clutch spring 120, and the member 131b to the sleeve 30 which, as mentioned above, is free to move axially without resistance. Therefore, instead of expanding its force to drive the motor through the sleeve 30, member 23 and shaft 3, the reversed torque acts immediately to resume the axially rearward movement of the sleeve 30 until the groove 41 reaches the plungers 35. The plungers then snap into position in the groove 41, actually assisting the completion of the axially rearward movement of the sleeve 30 and bringing the parts to the positions shown in Figures 2 and 7. Thus, the overrunning clutch spring 120 need be strong enough only to shift the relatively free sleeve 30 and is not capable of actually driving the motor. This rearward movement of the member 30 just described has carried the teeth 32 in the positive engagement with the teeth 108 on the clutch collar 107, which is fixed and serves as a driving member for the gear cage 79, and the meshing of the teeth is facilitated by the particular form of the teeth (Figures 13 and 14). If now, the motor is accelerated so that the shaft 3 again becomes the driving part of the system, the drive is transmitted through the members 23, 30 and 107 to the epicyclic gear unit, and from there to the driven shaft 17, thereby driving the latter at an increased rate as compared with direct drive.

Thus, when the parts are arranged for direct drive between the shafts 3 and 17 (Figure 1), a reversal of torque of sufficient magnitude will immediately and automatically shift the member 30 rearwardly and will establish the parts in position for overdrive. This action is automatic upon the occurrence of a reversal of torque, but it will be remembered that by simply lifting his foot off the accelerator, the operator of an automobile can secure a reversal of torque whenever desired, so that the movement of the parts into their overdrive position is entirely within the control of the operator. It will be noted that the shift is made more or less independently of the relative speeds of the parts, since it is a torque reversal and not the relative speed of one part with respect to the other that effects the shift.

It will be remembered that the inclination of the spiral splines on the interengaged driving member 23 and shiftable sleeve 30 is such that in normal operation the torque transmitted tends at all times to move the shiftable sleeve 30 forwardly. Thus, when the parts are arranged in an overdrive, as in Figures 2 and 7, the torque transmitted tends to shift the sleeve 30 forwardly into direct drive position (Figures 1 and 5). However, this movement is initially resisted by the spring biased plunger or plungers 35, with the result that the parts remain in their overdrive position so long as the torque component arising by virtue of the spiral splines does not exceed that required to cause the sleeve 30 to force the plungers inwardly out of the groove 39. The amount of torque required to cause the sleeve member 30 to shift forwardly into direct drive position may be adjusted or controlled, first, by the springs 37, second, by the inclination of the side walls of the grooves 39 and 41 which need not be the same, and/or third, by the weight of the plungers 35. Since the parts are normally revolving, the effect of centrifugal force on the plungers 35 is to augment the springs 37 in holding them in the groove, 39 or 41, in which they are disposed. Thus, the faster the automobile is being driven, the greater will be the torque required to shift the sleeve 30, and this applies in both the shift into direct as well as the shift into overdrive.

When the torque exerted in normal forward driving with the sleeve 30 in its overdrive position becomes sufficient to overcome the plungers 35 and force them out of the groove 41, the shiftable sleeve 30 moves out of engagement with the clutch teeth 108 of the clutch member 107 and into an intermediate position, as in Figure 9, in which there is no appreciable resistance to axial movement of the sleeve. Then when the speed of the shaft 3 and sleeve 30 has increased sufficient to reach the speed of the clutch member 46 on the driven shaft 17, this being possible because the member 131b may overrun the member 107, as mentioned above, the overrunning spring 119 takes hold of the member 131a and the torque exerted against the sleeve 30 shifts the latter forwardly and completes the forward movement of the sleeve 30 until the teeth 32 are carried into engagement with the teeth 51 (Figure 8), which brings the shoulder 44 up against the face of the member 23, at which time the plunger 35 snaps into engagement with the groove 39. Thus again the plungers 35 aid in completing the movement of the sleeve 30.

By virtue of this construction, therefore, whenever the torque exerted exceeds a predetermined value, depending partly upon the speed of rotation of the parts, the unit automatically shifts to the lower speed, namely, direct drive. While this shift, also, is automatic, it is nevertheless entirely possible for the operator of the automobile to secure a shift from overdrive into direct drive at practically any time desired, merely by suddenly accelerating the engine so as to exert the torque required to overcome the bias of the plungers 35. So far as I am aware, it is broadly new to utilize the driving torque for shifting into a low ratio and to utilize the coasting or reversal torque for shifting into a high ratio, with overrunning clutch means not subject to the stresses involved either in driving the car or in turning the motor over against its own compression upon deceleration, but operative only to automatically complete the torque responsive shift into the other ratio after the positive connection in one ratio has been released. Preferably, the overrunning clutch springs 11a and 120 are made of material such as bronze, that has a low coefficient of friction with the sleeves 131a and 131b, so that the springs will slip slightly under load, thus insuring that the clutch teeth will always engage.

Under certain conditions it may be desirable to provide means for locking the unit in one or both positions as desired so as to temporarily overrule any torque-controlled call for a shift into a higher or a lower ratio. Referring again to Figure 2, the member 23 is provided with a recess 151 in which a plunger 152 is mounted for reciprocatory movement. The plunger 152 is hollow and at its lower end is bored to receive a screw 154 that is threaded into the member 23 to maintain the parts in position. A spring 155 surrounds the screw 154 and at its upper end bears against the head of the screw and at its lower end bears against the inner end of the plunger 152. When the unit is arranged for overdrive (Figure 2) and the speed of the parts is sufficiently great, centrifugal action causes the plunger 152 to move outwardly to its dotted line position, into an opening 157 formed in the shiftable sleeve 30. As long as the plunger 152 is in its dotted line position, the member 30 will be prevented from shifting, even though there should occur a temporary reversal of the torque, thereby holding the parts in their overdrive position so long as the speed is above a given value.

If desired, a manually controlled type of lock for controlling the movements of the shiftable sleeve 30 may be provided and can, for example, be controlled by a suitable member mounted on the dash of the automobile or some other point. Referring now to Figures 1 to 4, a sleeve 160 surrounds the shiftable sleeve 30 and is provided with a radially outwardly extending flange 161. The casing 11 is formed with an extended section 164 (Figure 3) which is milled, as at 165, to receive a supporting sleeve 166 which is flanged, as at 167, and is bolted or otherwise secured to the casing 11. The sleeve 166 supports a rock shaft 170, the inner end of which extends into the interior of the casing 11 and has an arm 171 fixed thereto. A yoke 172 is pivoted, as at 173, to the arm 171 and has spaced apart sections 176 and 177 (Figure 2) arranged to receive the flange 161. The arm 171 has a plurality of recesses 179 (Figure 3) into any one of which a spring pressed ball 181 carried by the flange 167 of the sleeve 160 is adapted to enter to hold the outer sleeve 160 in an intermediate position or in either of its end positions.

An arm 184 is fixed by clamping bolt 185 to the outer end of the rock shaft 170, and the outer end of the arm 184 is apertured, as at 186, to receive one end of an operating rod 187 which extends through the opening 186 in the arm 184 and is movable therein. A pair of springs 189 and 190 are disposed about the rod 187 and are placed on opposite sides of the arm 184. Suitable abutment washers 192 and 193 are carried by the rod 187 to receive the reaction of the springs 189 and 190, the washers being held in place by cotter pins 194 and 195. Thus, whenever a pull is exerted on the rod 187, the arm 184 rocks the arm 171 in one direction or the other to shift the position of the locking sleeve 160. The yielding of the springs 189 and 190 permits some relative movement between the arm 184 and the rod 187, as will be referred to below. The operating rod 187 may extend to or be controlled by means mounted on the instrument panel or some other convenient place easily accessible to the driver of the automobile. Preferably, however, the control is arranged so that the unit 10 is locked in direct position when the transmission 1 is in neutral or any speed other than direct.

Normally the locking sleeve 160 is rotatable with the driving member 23, and to this end the sleeve 160 is formed with a boss 196 (Figure 11) which is threaded to receive a cap screw 197. The inner end of the cap screw 197 extends through a slot 198 formed in the shiftable sleeve 30 and into a notch 199 in the central portion of one of the splines 26 on the driving hub member 23. The slot 198 is formed at the same angle as the spiral splines 26 and 31 and acts through the pin 197 to keep the sleeve 160 from rotating relative to the driving member 23.

As best shown in Figure 1, the torque-responsive shiftable sleeve 30 is provided with an aperture 201 in which a ball 202 is placed. The inner surface of the locking sleeve 160 adjacent the opening 201 is provided with an elongated recess or groove 203. It will be remembered that the sleeve 30 is shifted under the control of the transmitted torque from one position, that shown in Figure 1, for example, to another position, that shown in Figure 2, for example. The grooves 27 and 28 are formed to receive the ball 202, which is carried by the sleeve 30, in either of the final positions of the sleeve 30. The groove or slot 203 is deep enough to receive the ball 202 when the movement of the sleeve 30 relative to the driving member 23 causes the ball 202 to be forced out of one of the grooves 27 and 28, provided the locking sleeve 160 is in its intermediate position, as shown in Figures 1 and 2. Looking at Figure 1, it will be seen that if the ball 202 is prevented from moving out of the recess or groove 27 in the member 23, the shiftable sleeve 30 will be prevented from moving, regardless of the backward torque that may be transmitted from the shaft 17 through the sleeve 30 to the driving shaft 3. One way of preventing the ball 202 from leaving the groove or recess 27 is to shift the locking sleeve 160 to the right (dotted lines, Figure 5) so that the cylindrical portion 160a of the sleeve 160 overlies the ball 202 and prevents its movement out of the groove 27. If the sleeve 30 were in its overdrive position, with the ball 202 lying in the groove or recess 28 (Figure 7), then a movement of the sleeve 160 to the left (dotted lines, Figure 7) would prevent the sleeve 30 from moving out of its overdrive position, regardless of the amount of torque transmitted.

The operation of the locking sleeve and associated parts and the manner in which they function to preselect the locking of either of the ratios desired, will be clear from Figures 5 to 10, inclusive. In Figures 5, 6 and 7, the locking sleeve 160 is shown in its intermediate position, which unlocks both of the available ratios for control by the amount of torque, the shiftable sleeve 30 moving axially from one position to another as determined by the torque requirements. In Figure 5, the shiftable sleeve 30 is shown in its forward position, in which the drive is transmitted directly from the driving shaft 3 to the driven shaft 17, this being the position also indicated in Figure 1. With the locking sleeve 160 retained in its intermediate position as shown in Figure 5, when the sleeve 30 is shifted rearwardly under the effect of reversed torque, the first movement of the sleeve 30, which disengages the teeth 32 from the clutch teeth 51, also moves the locking ball 202 out of the notch or groove 27 and into the groove 203 in the locking sleeve 160. As the speed of the engine drops down to that of the collar 107 of the epicyclic gear unit and the reversed torque is transmitted momentarily through the overrunning clutch spring 120 from the member 107 to the member 131b, the continued torque will cause the sleeve 30 to resume its rearward movement until the ring 42 is brought into engagement with the forward face of the member 23 and the teeth 32 engaged with the clutch teeth 108 on the overdrive clutch member 107. It will be observed from Figures 5 to 7, that the notch or groove 203 in the locking member 160 accommodates the outward movement of the locking ball 202 (Figure 6) during its movement from the groove 27 to the groove 28. Similarly, the movement of the ball 202 will be accommodated when the sleeve 30 is moved from an overdrive position (Figure 7) back to its direct drive position (Figure 5).

If it is desired to lock the sleeve 30 in its direct drive position, as is shown in Figure 5, all that it is necessary to do is to move the sleeve 160 to the right into the dotted line position (Figure 5), which carries the cylindrical portion 160a of the sleeve 160 over the ball 202, thereby effectively preventing the latter from leaving the notch 27, and since the ball 202 cannot leave the notch 27 the sleeve 30 cannot be shifted. If, on the other hand, it is desired to lock the sleeve 30 in an overdrive position, as is shown in Figure 7, in that case all that it is necessary to do is to move the sleeve 160 forwardly into the dotted line position so as to bring the cylindrical portion 160b of the sleeve 160 over the ball 202, locking the latter in the notch 28, and thereby preventing the sleeve 30 from shifting out of its overdrive position. The movement of the locking sleeve 160 in either direction out of its intermediate position may be accomplished by moving the rod 187 (Figure 4) in one direction or the other, as described above.

The locking mechanism described above is also capable of being preselected; that is, when the transmission unit is in, say, direct drive the operator can arrange the unit so as to have the mechanism locked in overdrive if and when it is shifted into its overdrive position. According to the present invention all that it is necessary to do to preselect a locked overdrive relation is to shift the sleeve 160 forwardly from its neutral or intermediate position (full lines, Figures 5 to 7) into a forward position (dotted lines in Figure 7, and full lines in Figures 8, 9 and 10). The dotted line position of the sleeve 160 in Figure 8 is in its intermediate position. With the locking sleeve 160 in a position arranged to lock the unit in overdrive when the torque-responsive sleeve 30 is in direct drive, the relation of the parts are as indicated in full lines in Figure 8. Assume now that there occurs a reversed torque sufficient to shift the sleeve 30 toward its overdrive position. The position of the groove 203 is such that the ball 202 may move out of the slot 27 and into the groove 203, but from Figure 9 it will be noted that in this position the ball 202 engages the right hand margin of the groove 203. Then as the speed of the engine is reduced to correspond to overdrive relations, the resumption of reversed torque, as the resistance is transmitted back through the member 131b from the collar 107 through the clutch spring 120 to the sleeve 30, continues the rearward movement of the sleeve 30. Since, as stated, the ball 202 engages the margin of the groove 203 but cannot enter the groove or recess 28, this continued rearward movement of the sleeve 30 carries with it the locking sleeve 160 substantially to the dotted line position shown in Figure 9, this action being accommodated by the spring 190 (Figure 4) yielding to permit the sleeve 160 temporarily to follow the sleeve 30, until the ball 202 can enter the notch 28. As soon as the ball 202 is over the groove 28, the spring 190 acts against the arm 184 and the shaft 170 to return the sleeve 160 to the position shown in Figure 10 with the section 160b overlying the ball 202 which is the normally locked position for overdrive, as indicated in dotted lines in Figure 7. After the sleeve 160 moves over the ball 202 the sleeve 30 is effectively locked in overdrive and is no longer responsive to torque, for the reason that the ball 202 cannot leave the groove 28 and hence the sleeve 30 cannot be moved forwardly.

From the above description it will be apparent that the same action takes place when the sleeve 160 is moved into its direct locked position when the sleeve 30 is in an overdrive unit.

It will thus be apparent from the above description that the movement of the actuating rod 187 out of a position permitting automatic operation into a direct locked position or an overdrive locked position will immediately lock the shiftable sleeve 30 against movement if the sleeve 30 is already in direct or overdrive position, respectively, at the time the rod 187 is actuated. If, however, the sleeve is in the position other than the one it is desired to lock, just as soon as the desired ratio is selected or completed according to the torque controlled action of the unit, the latter is then locked in that ratio and cannot be disconnected therefrom except by returning the locking control into its unlocked position.

The two sleeve sections 131a and 131b, with the anti-friction ring 134 between them, are independently rotatable and are so arranged that when the shiftable sleeve 30 is in either one position or the other, one of the sleeve sections has its teeth engaged by the sleeve 30 while the other sleeve section is free of the sleeve 30. For example, when the unit is arranged for direct drive (Figures 1 and 5), the teeth 132 on the sleeve section 131a are engaged by the teeth 32 on the sleeve 30, while the other sleeve section 131b is free to idle since its teeth 133 are not in engagement with the teeth on the sleeve 30. In overdrive (Figures 2 and 7), the sleeve section 131b is engaged with the sleeve 30 while the other sleeve section 131a is free to idle. This particular arrangement of the separately rotatable sleeve sections 131a and 131b alternately engaged with the shiftable sleeve 30 is provided to accommodate driving the car in reverse and permitting the car to move backwardly, it being remembered that the unit 10 is disposed at the rear of the transmission and hence the parts of the unit 10 are subjected to both right hand and left hand rotation.

Assuming, by way of illustration, that the shiftable sleeve 30 is in its direct drive position (Figures 1 and 5) and that the transmission 1 is engaged in reverse and the main clutch connected. The shaft 3 will then be driven in a direction opposite to that indicated by the arrow in Figure 1 and this rearward or left hand rotation will be transmitted through the members 23 and 30 to the members 46 and 131a. It will be remembered that in the right hand rotation of the parts, as indicated by the arrow in Figure 1, the sleeve section 131b can overrun the member 107. This means that in the reverse or left hand direction the member 107 overruns the sleeve section 131b. However, the member 131b cannot overrun the member 107 in a reverse or left hand direction. Since in the direct position of the sleeve 30, the latter and the part 46 rotate faster than the member 107, whether driven forwardly or backwardly, the sleeve section 131b should be disconnected from the sleeve 30 while driving or moving the car in reverse. Hence, with the sleeve 30 in its direct drive position, the sleeve section 131b is free of the sleeve 30 and remains stationary or merely idles with the member 107 when the car is driven or is moved in reverse.

Reverse drive is accommodated in a similar manner when the clutch sleeve 30 is in its overdrive position (Figures 2 and 7). In this position of the parts a reverse or left hand rotation, as in reverse drive or in backward movement of the car, the part 46 is connected to the driven shaft 17 and will be rotated in a reverse or left hand direction at a greater speed than the member 107 which is connected to the driven shaft 17 through the planetary gear unit. In this direction the member 46 acts through the overrunning clutch spring 119 to drive the sleeve section 131a, but since this part is free of the shiftable sleeve 30, no interference is experienced.

During the transition period when the shiftable sleeve 30 is in an intermediate position it engages both of the sleeve sections 131a and 131b. When the parts are in this position, reverse drive cannot be accommodated, and if attempted the overrunning clutch parts would become jammed and the wheels of the vehicle locked. Hence, as pointed out above, preferably the sleeve 30 is locked in its direct position in all selected gear ratios, including reverse, in the transmission except direct drive. If desired, of course, means controlled by the selection of reverse drive in the transmission could be provided for automatically holding the sleeve against shifting while in reverse. In this event, the shift-locking control part 181 could be separated from the transmission gear shift and constructed and arranged to permit automatic operation into either a direct locked position or an overdrive locked position at any time desired, and entirely regardless of whether or not the transmission unit is at that time in one or the other of its available ratios, except reverse.

Although the shaft 3 has been described above as constituting the driving shaft for the unit 10 and the shaft 17 the driven shaft, it will be obvious that this relation may be reversed if desired; that is, the shaft 17 may become the driving shaft and the shaft 3 or a part attached to the member 23 in lieu thereof may become the driven shaft. In that case, the unit becomes a reduction unit and torque in the forward or right hand direction will tend to shift the sleeve 30 into its direct drive position, engaging the member 46, while torque reversal will tend to shift the sleeve 30 into what would be, under the conditions assumed, an underdrive or speed reduction position.

The present invention is not necessarily limited to providing two different ratios and torque responsive means for automatically selecting one or the other ratio. Figure 15 illustrates an arrangement embodying a transmission unit substantially the same as that described above except that the unit is not responsive to the torque transmitted.

Referring now to Figure 15 in which parts that are identical with those described above have been indicated by the same reference numeral and in which for purposes of clarity portions of the epicyclic gear unit 60 has been omitted, the reference numeral 223 indicates a driving member that is fixed to the rear end of a driving shaft 3a, as by being mounted on splines 225 formed in the rear end of the shaft 3a. The driving member 223, like the member 23 described above, is secured in place on the shaft 3a by a cap screw 33 and a ring washer 34 which bears against the end of the member 23 and forces it up against the inner race of the bearing unit 4a which journals the shaft 3a for rotation in a supporting part 2a. The flange or hub section 230 of the member 223 is provided with a plurality of straight splines 231, instead of being spiral or helical as in Figures 1 and 2, and the splines 231 mesh with corresponding splines 232 formed on a shiftable sleeve 233, the latter having a flange 234 which is adapted to be engaged by the shift fork 172 shown in Figure 3. The rear end of the shiftable sleeve 233 is provided with another set of straight splines 236 which mesh with the teeth 132 on a sleeve member 131 and are adapted to mesh with the clutch teeth 51 and 108, optionally. Preferably, the ends of the teeth 51, 108, 236 and 237 are formed in the manner shown in Figures 12, 13 and 14 to facilitate shifting from one ratio to the other. The other parts of the transmission unit shown in Figure 15 are substantially the same as those shown in Figure 1, the position of the sleeve 231 being under the control of the rock shaft 170 and arm 184 and serving to determine whether the drive is transmitted directly to the shaft 17 through the clutch collar 46 or through the collar 107 and epicyclic gear unit 60.

The shiftable sleeve 233 is held yieldingly in one position or the other by means of a spring pressed ball 240 which seats in a recess 241 in the hub section 230 and the drive member 233 and is urged outwardly by a spring 242. The ball 240 is adapted to enter either of two peripheral grooves 244 and 245 which are formed in the splines 232. The shifting movement of the sleeve 233 is limited in one direction by the engagement of the teeth 236 with the face of the section 230, or by the engagement of a spring ring 246 which is snapped in a groove formed in the forward end of the sleeve 233.

The unit shown in Figure 15 is not responsive to the torque transmitted, but is adapted to be manually controlled at all times. Thus, the movement of the rod 187 in one direction or the other acts through one or the other of the associated springs shifts the sleeve 233 from one position to another. Moreover, like the torque responsive form of the invention described above, the overrunning clutch springs 119 and 120 serve to synchronize the clutch parts and facilitate the shifting of the sleeve 233. The sleeve 131, unlike the sleeve sections 131a and 131b, is one integral part, and hence the unit shown in Figure 15 cannot accommodate reverse rotation and for automotive work should therefore be disposed forward of the transmission.

It will be noted that the principles of the present invention as embodied in the transmission units described above have been set forth as adapted for units which are in the nature of attachments or auxiliary accessories for conventional transmissions. However, the present invention is equally applicable to the construction of transmission which do not have auxiliary units but which is nevertheless made partially or completely automatic, as may be desired.

Referring now to Figure 16, the reference numeral 275 indicates in its entirety a transmission having a gear box 276 and driving and driven shafts 277 and 278 journaled therein. For convenience of illustration I have shown a transmission which is more or less of the conventional type, in so far as it has three speeds forward and reverse, but provided with a unit indicated in its entirety by the reference numeral 280 which renders the transmission automatic as regards the selection of second or third speeds according to torque and speed requirements.

The transmission 275 includes a lay shaft 282 upon which a tubular countershaft 283 is mounted for rotation, as by bearings 284 and 285. The countershaft 283 includes a gear 287 which meshes was a gear 288 that is carried by or formed integrally with the driving shaft 277. The rear end of the countershaft 283 is splined, as at 291, and shiftably receives a sliding gear 292 having a hub 293 which is grooved at 294 to receive a shift fork 295 of any suitable construction. Rearwardly of the gear 292 is a compound gear unit 297 which includes two gear sections 298 and 299. The gear cluster 297 is held against movement by a pair of spring rings 301 and 302.

The driven shaft 278 includes a rear splined portion 305 on which a sliding gear 306 is mounted. The gear 306 is controlled by a shift fork 307 and may be shifted into mesh with the gear section 298 or with a reverse idler (not shown) that is driven from the gear section 299. When the gears 298 and 306 are in mesh, the transmission is arranged for first or low speed, as in conventional practice. Forward of the splined section 305 the driven shaft 278 is formed to receive a bushing 308 upon which a gear 310 is mounted for rotation, and forward of the gear 310 the shaft 278 is splined, as at 311, the forward reduced end 312 of the shaft 278 being supported by pilot bearings 313 in a recess 314 formed in the rear end of the driving shaft 277.

According to the principles of the present invention, when the gear 292 is shifted forwardly into mesh with the gear 310 the operation of the automatic torque responsive unit 280 is such that the drive from the driving shaft 277 to the driven shaft 278 is transmitted either directly or through the pairs of gears 288, 287 and 292, 310 to provide two different ratios which are automatically selected according to torque conditions. The unit 280 by which this automatic operation is secured will now be described.

A clutch section 320 is formed on or carried by the driving shaft 277 and has clutch teeth 321 which preferably are of the same form shown in Figures 1 and 13. A second clutch section 323 is formed on or carried by the gear 310 and has a plurality of clutch teeth 324 substantially like those shown in Figures 1 and 14 described above. The splined section 311 of the driven shaft 278 receives a driven hub member 328 which is fixed against rotation and axial displacement in the section 311 in any suitable manner. The driven member 328 is formed with spiral or helical splines 329 which are interrupted by a pair of axially spaced grooves 331 and 332. A shiftable sleeve member 335 is provided with a radially inwardly directed central flange section 336 which is formed with spiral or helical spline teeth 338 in constant mesh with the splines 329 on the driven member 328. The spline teeth 338 do not extend entirely across the flange section 336 but terminate short thereof, forming, in effect, two grooves 339 and 340 for the reception of a ball plunger 341 which is carried in a recess 342 formed in the driven member 328 and biased for outward movement by a spring 343.

The shiftable sleeve 335 is provided with two sets 344 and 345 of straight spline teeth with which a pair of clutching members 348 and 349 are in constant engagement, the members 348 and 349 having teeth 351 and 352 with which the teeth 344 and 345 are in engagement. The central portion 336 of the shiftable sleeve 335 receives a locking plunger 355 and a locking sleeve 356 surrounds the shiftable sleeve 335 and is formed with a groove 357 in which the outer end of the locking plunger 355 is disposed when the sleeve 335 is in an intermediate position, as shown in Figure 16, in passing from one position to another. The sleeve 335 is limited in its shifting movement by engagement of the central section 336 with one or the other of the members 348 and 349. The locking sleeve 356 may be controlled manually by any suitable means, such as the construction indicated in Figures 3 and 4 and described above.

The members 320 and 323 correspond functionally to the clutch collars 46 and 107 described above. The member 320 includes an axially inwardly directed flange 360, and an axially directed flange 362 is formed on the other clutch section 323. An overrunning clutch spring 364 is disposed between the members 320 and 348, one end of the clutch spring 364 being anchored to the member 320. Another overrunning clutch spring 365 is disposed between the members 310 and 349, one end of the spring 365 being anchored to the clutch section 323. The clutch spring 364 is so wound that the clutch section 320 can overrun the member 348 in the driving direction, but the latter cannot overrun the section 320 in that direction. Similarly, the member 349 can overrun the clutch section 323 in the driving direction, as indicated by the arrow in Figure 16, but the section 323 cannot overrun the member 349 and hence will drive the latter in the driving direction.

The operation of the transmission 275 is substantially as follows:

Low and reverse may be selected in the usual manner by shifting the gear 306 forwardly or rearwardly, as by the shift fork 307. After the car has been driven in low and it is desired to proceed to a higher speed, the gear 292 is shifted forwardly on the countershaft 283 into mesh with the gear 310 journaled on the driven shaft 278. From this point on, the control of the ratio at which the shaft 278 is driven is dependent upon torque conditions in substantially the same manner as the unit shown in Figure 1 and described above.

The parts are represented in Figure 16 as in a transitory position intermediate a position in which the shiftable sleeve 335 is moving from a position engaging one of the clutch sections 320 and 323 to a position engaging the other. Assuming that the automobile has been driven under conditions requiring more torque than it is desired or possible to exert when the shafts 277 and 288 are connected directly together, and further assuming that the amount of torque exerted between the shiftable sleeve 335 and the hub member 328 has been sufficient to force the spring pressed balls 341 inwardly against the springs 343, which permits the parts to take the position shown in Figure 16, in this position the clutch teeth 344 are out of engagement with the teeth 321 and acceleration of the engine will cause the clutch section 320 to overrun the member 348 and the member 349 to overrun the gear 310 until the gear 310 rotates at the same speed as the member 349. When this occurs the gear 310, which cannot overrun the member 349, begins to drive the latter through the spring 365. At this time, however, the sleeve 335 is freely shiftable so that the instant any torque is exerted, the force is expended, not in driving the car, but in causing the sleeve 335 to continue its rearward shifting movement until the teeth 345 engage the clutch teeth 324 on the clutch section 323 and the spring biased ball 341 drops into the groove 339, whereupon a positive drive in second speed is effected.

When it is desired to go into direct or high speed, the operator decelerates the engine, and the reversal of torque acts through the helical splines to shift the sleeve 335 forwardly, forcing the ball 341 out of the groove 339, until the teeth 344 engage the clutch teeth 321 and the ball 341 drops into the other groove 340, in the manner described in detail in connection with Figures 1 and 2. As will be apparent, the weight of the balls or plungers, the angle of the groove side walls, and the rate of rotation control the shift from a high ratio to a lower ratio in response to increased torque, and the shift to the other, or lower, ratio is likewise controlled. While I have shown the side walls of the grooves associated with the shift controlling balls or plungers as being substantially the same angle, with the consequence that about the same amount of torque, although in opposite directions, will bring about a shift in ratio, it will be understood that these angles and the other factors may be varied as desired. Also, while in Figure 16 I have shown only one torque responsive unit, this invention comprehends transmissions with two or more torque-responsive units to provide an automatic control of as many ratios as desired. The units associated with the lower ratios would be adjusted to be responsive to higher torques than the higher ratios. For example, the unit shown in Figures 1 and 2 may be connected to be driven by the shaft 278 of Figure 16, and in that case any one of four ratios would be selected automatically, and the unit 15 would be made responsive to a lower range of torques than the unit 280, since in such a combination the unit 280 should remain in its high speed position throughout the shifting range of the unit 15.

In the transmission of Figure 16 the sleeve members 348 and 349 are separate parts, similar to the sleeve sections 131a and 131b described above in connection with Figure 1, but these members are not separately rotatable since they are in constant connection with the slidable sleeve 335. The overrunning clutch springs 364 and 365 in this form therefore cannot accommodate the reverse rotation of the shafts 277 and 278. This is, however, an advantage. It will be noted that the reverse gearing in this form is disposed rearwardly of the unit 280, and therefore the unit is never subjected to being driven in reverse. Hence, the unit 280 in its present form will serve as means preventing backward movement of the car whenever the gears 310 and 292 are in mesh. If these gears are out of mesh, then backward movement of the car, irrespective of whether or not reverse gear is selected in the transmission, is accommodated.

Assuming that the gears 292 and 310 are in mesh, the manner in which the unit 280 serves as a "no-back" feature is as follows:

It will be remembered that for right hand or forward rotation, in the direction of the arrow shown in Figure 16, the part 320 can overrun the part 348, and the part 349, which rotates at all times with the part 348, can overrun the part 310, the clutch springs 364 and 365 being arranged to accommodate this action. However, in the reverse or left hand rotation, opposite to the arrow shown in Figure 16, the member 348 can overrun the member 320, and the member 323 can overrun the member 349. Also, the member 320 can drive the member 348 and the member 349 can drive the member 323. Thus, if the gear 292 is in mesh with the gear 310, and a backward movement of the car tends to cause a reverse rotation of the shaft 278, the part 320, which is driven faster than the part 323 will tend to drive the member 348, and with it the member 349. However, the member 349 tends to drive the part 323, but this part is forced to rotate slower than the part 320 due to the transmission gearing, and as a result, the parts will lock and prevent reverse rotation. As stated, this occurs only when the gear 292 meshes with the gear 310, and therefore the unit 280 serves to prevent the car from rolling backward when the transmission is in second or high, depending on the position of the sleeve 335.

The units described above have been designed for inclusion in or attachment to an automobile transmission, preferably at the rear end thereof, but it is not to be considered that the species of this invention as so far described are limited to installations of this character. For example, the torque responsive and planetary gear units may be arranged to be carried by the rear axle of an automobile, just forward of the driving pinion. A properly constructed unit embodying this invention is not heavy and when installed in the rear axle construction of an automobile does not add any objectionable amount of unsprung weight to the axle.

Referring now to Figure 17, the rear axle is indicated by the reference numeral 401 in its entirety and, as illustrated, is of a hypoid type and includes a sleeve 402 in which a pinion shaft 403 is disposed. The pinion 404 meshes with a ring gear 405 in the usual manner, and the shaft 403 is supported in the proper position by roller bearings 407 and 408, there being a spacer 409 between the inner races of the bearings. A nut 410 is threaded onto a screw threaded portion 411 of the shaft 403 for the purpose of clamping the inner races and the spacer 409 on the shaft 403.

The forward portion of the sleeve 402 is flanged, as at 412, and receives a collar 413 which forms a part of or is secured to a casing 414. Preferably, the collar 413 has a flange 415 which is apertured to receive cap screws 416 that secure the collar 413 to the casing 414. The latter encloses planetary gear and overdrive units indicated in their entirety by the reference numerals 417 and 418, respectively. The forward end of the casing 414 is closed by a plate 420 which is flanged at 421 and has an interior toothed section 422 which will be referred to later. The propeller shaft is indicated at 423 and is disposed in a propeller shaft housing 424 that is secured by cap screws 425 to the forward end of the casing 414. The flange 421 of the plate 420 is provided with holes through which the cap screws 425 extend, whereby when the latter are tightened the plate 420 is secured firmly and rigidly in position between the rear end of the propeller shaft housing 424 and the casing 414. The rear end of the propeller shaft 423 is journaled on suitable bearings 428 carried in a recess 429 in the plate 420. The end section of the propeller shaft 423 extends rearwardly almost entirely through the casing 414 and is connected by a pilot bearing 431 to the forward end of the pinion shaft 403 in coaxial relation.

The rear end of the propeller shaft 423 is splined, as at 440 and is shouldered, as at 441, to receive a ring 442. The planetary gear cage of the unit 417 is indicated in its entirety by the reference numeral 445 and includes a member 446 having a splined hub 447 disposed in driving engagement on the splines 440 of the propeller shaft 423. The member 445 is flanged, as at 448, and apertured to receive the tubular pins 451 upon which the planet gears 452 are journaled for rotation. A ring 453 receives the ends of the pins 451 opposite the ends carried by the flange 448, the ring 453 thus forming a part of the planet gear cage 445.

The planet gears 452 mesh with a stationary sun gear 456 which is supported by the member 420 in any suitable manner. Preferably, the ends of the teeth of the sun gear are reduced, as at 457, and received in the splines of the section 422. A spring ring 458 is carried by one end of the sun gear and serves to hold the shouldered sections of the teeth up against the side of the section 423 opposite which the spring ring 458 is disposed.

The ring gear of the unit 417 is indicated at 461 and comprises a gear section 462 and a hub section 463, the latter being journaled for rotation on the hub 447 by suitable antifriction bearings 464. The outer flange section 465 of the member 463 is formed with teeth that receive the reduced ends 467 of the teeth 468 of the ring gear member 462. A spring ring 469 serves to hold the member 462 on the flange 465. The hub 463 is formed with a tooth clutch section 471 and an axially extending flange 472 about which an overrunning clutch spring 473 is disposed. Also secured on the splined portion 440 of the propeller shaft is a hub 475 which is also formed with a toothed clutch section 476 and a flange 477 about which a second overrunning clutch spring 478 is disposed. Preferably, the overrunning clutch springs 473 and 478 are similar to or identical with the clutch springs 119 and 120 described above.

The forward end of the pinion shaft 403 is splined and receives a driven hub member 480 which is secured thereto in any suitable manner, as by a pin, 481. The member 480 is provided with spiral splines 482 and circumferential grooves 483 and 484 and is substantially the same construction as the member 23 described above in connection with Figure 1. The remainder of the torque responsive unit 418 embodies parts which are substantially identical with the corresponding parts shown in Figure 1 and described above, and hence the same reference numerals have been applied. A speedometer drive gear 486 is mounted rearwardly of the units 417 and 418 and between the member 480 and the lock nut 410. The locking sleeve 160 is preferably controlled in the same manner described above in connection with Figures 1 to 10.

The operation of the form of the invention shown in Figure 17 is substantially the same as described above in connection with Figure 1. The unit shown in Figure 17 is also an overdrive unit, although the position of the planetary gear and torque responsive units have, in Figure 17, been reversed as compared with the arrangement shown in Figure 1. Thus, it will be apparent that the present invention is not dependent upon any particular arrangement of the torque responsive and planetary gear units and, further, that either end may be the driving or driven end, as desired.

In operation, the propeller shaft 423 is driven in the direction of the arrow shown in Figure 17, and the spiral splines 482 and the corresponding splines 31 on the shiftable sleeve member 30 are so arranged that driving torque in a right hand or forward direction tends to shift the sleeve 30 rearwardly so that the teeth 32 on the sleeve 30 engage the toothed clutch section 476, thereby providing for a direct drive between the shafts 423 and 403. Shifting movement of the sleeve 30 is resisted by the spring pressed plunger 35 described above in connection with Figure 1. Upon the occurrence of a torque reversal, as by closing the throttle of the motor, the sleeve 30 is shifted forwardly until the teeth 32 clear the toothed section 476. The overrunning clutch springs 473 and 478 are so arranged that the part 463 can overrun the sleeve section 131a and the sleeve section 131b can overrun the member 475. Thus, in the intermediate position of the shiftable sleeve 30, where both of the sleeve sections 131a and 131b are connected together through the sleeve 30, the momentum of the car will drive the sleeve 30 and the members 131a and 131b until the speed of the motor decreases to the point where the member 463, which is geared through the unit 417 to rotate faster than the propeller shaft 423, rotates at the same speed as the sleeve section 131a. At this instant the small amount of torque exerted by the tendency of the member 131a to drive the part 463 establishes sufficient force to continue the forward movement of the shiftable sleeve 30 until the teeth 32 thereof engage the toothed section 471 on the member 463, thus connecting the parts for overdrive. The motor can then be accelerated and will drive the car at a high speed in overdrive. However, if the torque exerted should increase beyond a predetermined amount, the sleeve 30 will be shifted automatically back to its direct drive position, substantially as described above in connection with Figure 1.

The construction shown in Figure 17 will accommodate a reverse drive in substantially the same manner as described above in connection with Figure 1, since in either the direct or the overdrive position of the shiftable sleeve 30, one or the other of the overrunning clutch members 131a and 131b is free to idle in either direction relative to the associated parts.

The form of the invention shown in Figure 18 embodies substantially the same parts shown in Figure 17 except that different forms of propeller pinion shafts are accommodated, and the parts, although substantially identical in the majority of instances, have been arranged to provide a reduction unit instead of an overdrive unit as in Figure 17. Parts that are identical with the construction in Figures 1 and 17, have been identified by the same reference numerals.

In Figure 18, the forward end of the pinion shaft 403a is extended through the unit and is piloted by bearing means 431a in a driving member 501 which has a splined connection at the rear end of the propeller shaft 423a. The driving member 501 has a recessed section receiving the inner race of the bearing means 428, and the outer drive or flange portion of the member 501 is provided with left hand spiral splines 502 which engage corresponding splines 503 formed on the interior of the shiftable sleeve 30. The sun gear 456 of the planetary unit 417 is held in stationary relation by an interiorly splined section 422a which is formed integral with the forward portion of the collar 413a.

In operation, driving torque in the forward or right hand direction, as indicated by the arrow in Figure 18, acts through the splines 502 and 503 tending to shift the sleeve 30 rearwardly into engagement with the toothed section 471 on the hub 463 of the ring gear member 461a, and a reversal of the torque tends to shift the sleeve 30 forwardly into connection with the toothed section 476 formed on the member 475 that is fastened directly to the forward end of the pinion shaft 403a. In Figure 18 the member 461a is shown with the hub and ring gear proper as formed integrally, but they may be formed separately as indicated in Figure 17, if desired. In the construction shown in Figure 18, the overrunning clutch springs 473 and 478 are so arranged that, in the forward or right hand direction as indicated by the arrow, the part 463 can overrun the sleeve section 131a and the sleeve section 131b can overrun the part 475. Thus, when the parts are arranged as shown in Figure 18, that is, for direct drive, the rotation of the gear cage 445 drives the ring gear member 461a faster than the rotation of the pinion shaft 403a and the part 475 carried thereby. Hence, the part 463 overruns the sleeve section 131a, both when the shiftable sleeve 30 is in its direct drive position and when it is in an intermediate position in the process of shifting from direct to underdrive.

The shift from direct to underdrive occurs when an excessive amount of torque is exerted between the member 501 and the sleeve 30, and as soon as the teeth 32 on the sleeve 30 disengage from the toothed section 476, the motor and propeller shaft 423a speed up, sleeve section 131b thereby overrunning the member 475 until the speed of the sleeve section 131a, which in the intermediate position of the sleeve 30 and rotates with the latter, is equal to the speed of the part 463. At this moment the torque exerted acts to complete the rearward movement of the shiftable sleeve 30 until the teeth 32 come into engagement with the toothed section 471, whereupon the drive to the rear axle is resumed but now it is transmitted through the unit 417 at a reduced rate.

In both Figures 17 and 18 movement of the shiftable sleeve 30 in response to the torque exerted is or may be controlled by the locking sleeve 160 in the same manner as described above in connection with Figure 1, and if desired the same or similar arrangement mentioned above in connection with Figure 1 for positively holding the shiftable sleeve 30 in one or the other of its positions during reverse drive may be provided.

It will be observed that by virtue of applicant's particular arrangement of the overrunning clutch means, there is always a definite ratio between the rates of rotation of the driving and the driven parts that cannot be exceeded. For example, in Figure 1, since the part 131a drives the part 46 (which is secured directly to the driven shaft 17), it will be seen that the driving shaft 3 cannot rotate faster than the shaft 17. Likewise, since the part 131b overruns the part 107 in a forward direction and the part 107 therefore will drive the part 131b in the forward direction through the clutch spring 120 when the power on the drive shaft 3 ceases, it will be seen that the drive shaft 3 cannot rotate slower than the part 107 which, by virtue of the overdrive unit 60, always rotates slower than the driven shaft 17. The same relations exist in the form of the invention shown in Figure 18 in which the driving shaft 423a cannot rotate faster than the driving part 463 of the planetary gear unit 417 or slower than the part 475 which is fixed directly to the driven shaft 403a. By virtue of the underdrive unit 461a, the part 463 always rotates faster than the shaft 403a. In Figures 16 and 17, the driven shaft cannot rotate faster than the faster rotating part of the two driving members nor slower than the slower driving member. That is to say, in Figure 16, the driven shaft 278 may not run faster than the part 320, which is on the driving shaft 77, nor may the driven shaft 278 run slower than the part 323, which is driven at a reduced rate through the gear 292 from the counter shaft 283. In Figure 17 the driven shaft 403 cannot run any faster than the part 463 or slower than the part 475. By virtue of the planetary gear unit 461, the part 463 always rotates faster than the part 475 which is fixed directly to the driving shaft 423.

While I have shown and described above the preferred means in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a transmission, shiftable means providing two different ratios, torque responsive mechanism comprising overrunning slipping clutch means for moving said shiftable means from one ratio to another, and a manually controlled locking part movable from neutral position into either of two positions corresponding to the two positions of said shiftable means, said locking part cooperating with said shiftable means for locking the latter in a selected ratio after said locking means and said shiftable means have been moved into a position corresponding to the selected ratio.

2. In a transmission for automobiles and the like, and having driving and driven parts, means providing two different ratios at which the driven part may rotate with respect to the driving part, spaced apart members connected to transmit the drive from one part to the other at different ratios through said means, a shiftable part operatively connected with the driving part and engageable with either of said members, a pair of overrunning slipping clutches connecting said shiftable part with said members when the shiftable part is out of engagement with both of them, and manual means for locking said shiftable part in either of its positions.

3. In a transmission, driving and driven parts, a pair of spaced apart members connected, respectively, at different ratios with one of said parts, a shiftable member movable to two positions, means operatively connecting said shiftable member with the other part, said shiftable member being movable into engagement with either of said spaced apart members in torque transmitting relation, and into an intermediate position out of torque transmitting relation with said spaced apart members, and overrunning slipping clutch means operatively connecting said shiftable member with both of said spaced apart members when the shiftable member is in its intermediate position.

4. In a transmission, driving and driven parts, a pair of spaced apart members connected, respectively, to drive said driven part at different speeds, a shiftable member operatively connected with said driving part and movable into engagement with either of said driving members and into an intermediate position therebetween, manual means for moving said shiftable member from a position engaging one of said driving members to a position engaging the other driving member, a pair of overrunning slipping clutch units separately connecting said shiftable member with said driving members, respectively, one of said units connecting the shiftable member with one of said driving members when the shiftable member is in one position and the other unit connecting the shiftable member with the other driving member when the shiftable member is in its other position, whereby one or the other of the overrunning clutch units is free to accommodate reverse rotation when the shiftable member is in either of its positions.

5. In a transmission, driving and driven parts, a pair of spaced apart members connected, respectively, to drive said driven part at different speeds, a shiftable member operatively connected with said driving part and movable into engagement with either of said driving members and into an intermediate position therebetween, overrunning slipping clutch means operatively connecting said shiftable member with said driving members when the shiftable member is in its intermediate position, and manually controlled means for shifting said movable member from a position engaging one of said driving members to a position engaging the other driving member.

6. In a transmission, a member having a pair of peripheral grooves extending annularly of said member, a sleeve surrounding said member, helical splines separate from said annular grooves for establishing a shiftable torque responsive connection between said member and said sleeve, said sleeve having an opening therein, a locking part disposed in said opening and movable with said sleeve from a position wherein the locking part can enter one of said grooves to a position where said part can enter the other groove, and a shiftable member disposed about said sleeve and having an opening to receive said locking part when the latter and said sleeve are moved from one position to the other, said shiftable member being movable into positions preventing the passage of said part out of either of said grooves through said opening.

7. In a transmission, a driving member having a pair of peripheral grooves therein, a locking part adapted to be disposed in either of said grooves, a shiftable sleeve surrounding said grooved member and having an opening in which said part is disposed and through which said part is movable to permit the part being disengaged from one of said grooves and the sleeve shifted to a position in which the part can enter the other groove, and manually controlled means surrounding said sleeve and having an interior recess permitting the part to move out of one of said grooves and move with said sleeve relative to said member into its other position, said locking member being shiftable in either direction from its central position for holding said part in one of said grooves to thereby lock the sleeve to said member.

8. In a transmission, a member having helical splines, a sleeve surrounding said member and having a cooperating set of helical splines whereby said sleeve rotates with said member, at least one of the splines of said sleeve being interrupted to form a pair of notches, and a spring biased plunger carried by said member and adapted to move in an outward direction under the action of the biasing spring and of centrifugal force so as to enter either of said recesses when the torque transmitted between said member and said sleeve causes the latter to shift in one direction or the other relative thereto.

9. In a transmission having a reverse gear and shift means therefor, aligned driving and driven shafts. a shiftable member having a torque responsive connection with said driving shaft and movable from one position to another relative to said driven shaft, a part fixed directly to said driven shaft, a second part operatively connected to said driven shaft through a set of gearing, said shiftable member being engageable with either of said parts to transmit the drive to said driven shaft either directly or through said set of gearing, means having splined connection with said shiftable member, and a pair of overrunning friction slippage clutch units separately connecting said means to said first and second parts, either of said units being capable of transmitting a limited amount of torque sufficient to move said shiftable member when the latter is out of engagement with both of said first and second mentioned parts.

10. In a transmission, driving and driven parts, a pair of driving members connected, respectively, to drive said driven part at different speeds, a shiftable member operatively connected with said driving part and movable into engagement with either of said driving members and into an intermediate position out of engagement therewith, a sleeve section disposed about each of said driving members, overrunning clutch means connecting each of said sleeve sections to the associated driving member, torque-responsive means for shifting said sleeve from one position to another, and clutch teeth formed on said sleeve sections and said shiftable member whereby, when said shiftable member is in one of its positions, one of said sleeve sections is connected to said shiftable member and, in turn, connects the latter to the associated driving member while the other sleeve section is capable of free rotation, the latter serving to connect the shiftable member, when it moves out of said one position, with the other driving member and act through said torque-responsive means for continuing the movement of said shiftable member into its other position and releasing said first-mentioned sleeve section.

11. A transmission comprising driving and driven shafts, a gear on said driving shaft, a countershaft connected to be driven from said gear, a gear member mounted for rotation on said driven shaft, means for optionally connecting said rotatable gear to be driven from said countershaft, a hub member fixed to the forward end of the driven shaft in a position between said rotatable gear and said countershaft driving gear, a shiftable member having a splined torque responsive connection with said hub member, said torque-responsive connection providing for movement of said shiftable member either into engagement with the rotatable gear or into engagement with the countershaft driving gear, according to torque conditions, reverse gearing rearwardly of said gears and adapted to be connected when said rotatable gear is out of connection with said countershaft gear, and overrunning clutch units operatively connecting said shiftable member with said countershaft driving gear and said rotatable gear, respectively, said overrunning clutch means being adapted to accommodate forward rotation of the shafts but arranged to prevent backward rotation of said driving and driven shafts when said countershaft gear is operatively connected with said rotatable gear.

12. In a driving axle construction including a pinion shaft, and a propeller shaft, a change speed unit including an axially shiftable part having torque responsive connection with one of said shafts, change speed gearing connected to the other shaft and including one part directly fixed to said other shaft and another part in driving relation with respect to said other shaft through the change speed gearing, said axially shiftable member being adapted to engage one or the other of said parts, and overrunning clutch means connecting said axially shiftable member with both of said parts when the shiftable member is out of engagement with both of said parts.

13. In a driving axle construction having a pinion shaft and a propeller shaft aligned therewith, a change speed unit comprising a shiftable member having a torque responsive connection with said pinion shaft and movable from one position to another relative thereto, a part fixed directly to said propeller shaft, a second part operatively connected to said propeller shaft through a set of gearing, said shiftable member being engageable with either of said parts to transmit the drive to said pinion shaft from said propeller shaft either directly or through said set of gearing, means having splined connection with said shiftable member, and a pair of overrunning clutch units separately connecting said means to said first and second parts when said shiftable member is out of engagement with both of said first and second parts.

14. In a driving axle construction having a pinion shaft and a propeller shaft aligned therewith, a change speed unit comprising a shiftable member having a torque responsive connection with said propeller shaft and movable from one position to another relative thereto, a part fixed directly to said pinion shaft, a second part operatively connected to said pinion shaft through a set of gearing, said shiftable member being engageable with either of said parts to transmit the drive to said pinion shaft either directly or through said set of gearing, means having splined connection with said shiftable member, and a pair of overrunning clutch units separately connecting said means to said first and second parts when said shiftable member is out of engagement with both of said first and second mentioned parts.

15. In a transmission, a pair of members having a splined connection providing for rotation of said members together but permitting one to shift generally axially relative to the other, one of said members having a pair of recesses therein and the other member having an opening therein, a locking part disposed in said opening and adapted to extend partially into one or the other of said recesses according to the axial position of said one member relative to the other, said locking part and said recesses being so arranged that substantially all torque is transmitted through said splined connection independently of said locking part and recesses, said part being adapted to extend outwardly of said opening when said one member moves from one position to another relative to the other member, a locking member disposed adjacent said pair of members and having an interior recess receiving said part when said one member is moved from one position to the other with said locking member in its intermediate position, yielding means for moving said locking member in either direction from said intermediate position, said movement serving to lock said part in one of said recesses if said sleeve is already in a position disposing said part in said recess, and said yielding means permitting said locking member to move temporarily beyond either of its positions when said shiftable member is moved into a corresponding position from its other position, said locking member then engaging the locking part and holding said shiftable member against subsequent movement.

16. In a transmission, driving and driven parts, a pair of spaced apart members connected, respectively, to be driven from said driving part at different speeds, a shiftable member operatively connected with said driven part and movable into engagement with either of said driving members and into an intermediate position therebetween, means for moving said shiftable member from a position engaging one of said driving members to a position engaging the other driving member, a pair of overrunning friction slippage clutch units separately connecting said shiftable member with said driving members, respectively, one of said units connecting the shiftable member with one of said driving members when the shiftable member is in one position and the other unit connecting the shiftable member with the other driving member when the shiftable member is in its other position, whereby one or the other of the overrunning clutch units is free to accommodate reverse rotation when the shiftable member is in either of its positions.

17. In a transmission, driving and driven parts, a pair of spaced apart members connected, respectively, to be driven from said driving part at different speeds, a shiftable member operatively connected with said driven part and movable into engagement with either of said driving members and into an intermediate position therebetween, overrunning friction slippage clutch means operatively connecting said shiftable member with said driving members when the shiftable member is in its intermediate position, and manually controlled means for shifting said movable member from a position engaging one of said driving members to a position engaging the other driving member.

18. A transmission comprising driving and driven shafts, a countershaft connected to be driven from said driving shaft, a gear member mounted for rotation on said driven shaft, means for optionally connecting said rotatable gear to be driven from said countershaft, a shiftable member having a torque-responsive connection with said driven shaft, means for shifting said shifting member into engagement with the driving shaft or with said rotatable gear, and means movable in one direction from a generally central position for locking said shiftable member in one of its positions and movable in the other direction for locking the shiftable member in its other position.

19. In a transmission, driving and driven parts, a pair of spaced apart members connected with the driving part, one of said members being connected directly to said driving part and the other connected through gear means for rotation therewith at a different ratio, whereby one of said members normally rotates at a lower speed than the other member, shiftable means movably connected with said driven part and arranged to connect the latter optionally with one or the other of said spaced apart members, overrunning slipping clutch means operatively connecting said shiftable member with the faster rotating one of the spaced apart members, whereby said driven part cannot rotate faster than the faster rotating one of said spaced apart members, and separate overrunning clutch means operatively connecting said shiftable member with the slower rotating one of said spaced apart members, whereby said driven part cannot run slower than said slower rotating member.

20. In a transmission, driving and driven parts, a pair of spaced apart members, one connected directly to said driven part and the other connected through gear means with the driven part, whereby said members rotate at different speeds relative to each other, one of said members rotating at a lower speed than the other, shiftable means operatively connected with said driven part and arranged to engage optionally one or the other of said spaced apart members, overrunning clutch means disposed between said shiftable member and the slower rotating one of said spaced apart members and arranged so that said driving part cannot rotate slower than the slower rotating one of said spaced apart members, separate overrunning clutch means disposed between said shiftable member and the other of said spaced apart members, whereby said driving part cannot rotate faster than the faster rotating one of said spaced apart members.

21. In a transmission, a pair of driving and driven parts, spaced apart members operatively connected to drive the driven part at two different ratios, an intermediate member having an overrunning clutch connection with each of said spaced apart members, whereby said intermediate member may overrun one of said spaced apart members and may be overrun by the other of said spaced apart members, an axially shiftable member having a helical splined connection with one of said parts, whereby said shiftable member tends to be shifted axially under the torque transmitted, means movably connecting said shiftable member with said intermediate member, means on said shiftable member adapted to engage either of said spaced apart members for transmitting the drive from the driving part to the driven part at either of the available ratios, yielding means tending to hold said shiftable member in either of its positions until the amount of torque transmitted causes said shiftable member to move out of engagement with the associated one of the spaced apart members, the overrunning clutch connection between the shiftable member and the spaced apart members serving to cause said shiftable member to complete its movement from an intermediate position, in which no torque is transmitted and hence no tendency to cause the shiftable member to be moved in either direction, to one of its end positions.

22. The combination with a transmission, of a unit comprising a driving part connected to be driven by said transmission, a driven part, a collar fixed to one end of one of said parts adjacent the other part, an epicyclic gear unit operatively connected with said one part in driving relation and including a collar disposed adjacent said first collar, a member having a helically splined connection with said other part and shiftable axially relative thereto, whereby the transmitted torque tends to shift said member in one direction or the other according to the direction in which the torque is exerted, means yieldingly restraining said member from axial movement until the amount of torque exerted exceeds a predetermined value, and means on said shiftable member for engaging one or the other of said collars whereby said one part may be driven from the other directly or through said epicyclic gear unit, according to torque conditions.

23. In a transmission, means providing two different ratios, a shiftable part for engaging said means for establishing either of said ratios, torque-responsive means for shifting said part, and locking mechanism comprising retaining means movable into one position for locking said part in one ratio and movable into another position for locking said part in the other ratio, said shiftable part being shiftable from one ratio to the other when said retaining means is in a third position, said locking mechanism being constructed and arranged so as to be releasable while torque is being transmitted through said transmission.

24. A change speed unit comprising a pair of driving and driven parts, spaced apart members associated with one of said parts and adapted to transmit the drive to the driven part at either of two different ratios, an intermediate member having an overrunning clutch connection with each of said spaced apart members whereby said intermediate member can overrun one of said spaced apart members and is overrun by the other of said spaced apart members, and a movable member having an axially shiftable connection with the other part and with said intermediate member, said movable member being adapted to engage either of said spaced apart members for completing the drive from the driving part to the driven part at either ratio, said overrunning clutch means connecting the movable member with said spaced members when said movable member is out of engagement with both of said spaced apart members.

25. A change speed unit comprising a gear train providing two different ratios between driving and driven parts, axially shiftable means having a torque responsive connection with one of said parts and responsive to the transmission of torque in one direction or the other for shifting the shiftable part so as to engage one or another element of said gear train for establishing one or the other of said ratios, biased detent mechanism for yieldingly holding said shiftable means in either of its positions, said axially shiftable means being out of driving torque transmitting relation when in an intermediate position, and two overrunning clutch means operatively connecting said shiftable means with said spaced members, respectively, and capable of exerting sufficient force to move said shiftable means out of its intermediate position in which no driving torque through either ratio is transmitted.

26. A change speed unit as defined in claim 25 further characterized by each of said overrunning clutch means including a collar carried by the associated member and connected therewith by overrunning clutch mechanism, the collar of each overrunning clutch means being connected with the shiftable member when the latter is in its intermedaite position but disconnected therefrom when the shiftable member directly engages the other of the spaced apart members.

27. A change speed unit as defined in claim 25, further characterized by said spaced apart members being connected with the driven part and the shiftable means having a torque responsive connection with the driving part.

28. A change speed unit as defined in claim 25, further characterized by said shiftable means having a torque responsive connection with the driven part and said spaced apart members being connected with said driving shaft and driven therefrom at different ratios.

29. Change speed mechanism comprising driving and driven parts, the driving part having a set of clutch teeth, a planetary gear unit including a stationary sun gear, a plurality of planet gears meshing therewith, a planet gear carrier member receiving said planet gears, and a ring gear member meshing with said planet gears, means connecting one of said members with said driving part, the other member having a set of clutch teeth, a shiftable clutch member connected to rotate with said driven part and movable into a position to engage one or the other of said sets of clutch teeth, whereby to drive said driven part from said driving part, either directly or through said planetary gear unit, and a helically splined connection between said shiftable clutch member and said driven part, whereby driving torque attends to move said shiftable clutch member axially from one set of clutch teeth to the other.

HERBERT C. SNOW.